United States Patent [19]

Fock et al.

[11] Patent Number: 4,692,267

[45] Date of Patent: Sep. 8, 1987

[54] USE OF POLYMERS OF ALKYLVINYL ETHERS TO PREVENT OR ELIMINATE FOAM ON AQUEOUS MEDIA

[75] Inventors: Jürgen Fock, Düsseldorf; Eberhard Esselborn; Hans-Ferdi Fink, both of Essen; Wernfried Heilen, Rheinberg, all of Fed. Rep. of Germany

[73] Assignee: TH. Goldschmidt AG, Essen, Fed. Rep. of Germany

[21] Appl. No.: 797,637

[22] Filed: Nov. 13, 1985

[30] Foreign Application Priority Data

Nov. 23, 1984 [DE] Fed. Rep. of Germany ....... 3442727

[51] Int. Cl.$^4$ .......................... C09K 3/00; B01D 19/04
[52] U.S. Cl. ..................................... 252/321; 252/358
[58] Field of Search ................................ 252/358, 321

[56] References Cited

U.S. PATENT DOCUMENTS

| | | | |
|---|---|---|---|
| 3,127,352 | 3/1964 | Stark, Jr. et al. | 252/321 |
| 3,557,017 | 1/1971 | Mange et al. | 252/331 |
| 3,954,886 | 5/1976 | Langdon | 252/358 |
| 4,502,977 | 3/1985 | Buriks et al. | 252/358 |

Primary Examiner—John F. Terapane
Assistant Examiner—Catherine S. Kelly
Attorney, Agent, or Firm—Toren, McGeady & Associates

[57] ABSTRACT

Method of using polymers of alkylvinyl ethers whose alkyl radical has 2 to 18 carbon atoms with a weight average molecular weight $\overline{M}_w$ of 400 to 10,000 in amounts of 1 to 200 ppm for preventing or eliminating foam on aqueous media.

22 Claims, No Drawings

USE OF POLYMERS OF ALKYLVINYL ETHERS TO PREVENT OR ELIMINATE FOAM ON AQUEOUS MEDIA

BACKGROUND OF THE INVENTION

1. Field of the Invention

The invention relates to materials and methods for their use in defoaming.

2. Description of the Prior Art

The use of vegetable or mineral oil for defoaming aqueous media is well known. Silicone oils have proven to be more effective than these oils and, when used in only small amounts, are able to suppress the formation of foam on aqueous media or to eliminate foam that has already been formed. However, such silicone oils may cause difficulties during the further processing or use of the defoamed aqueous media due to the excellent spreading properties or the hydrophobic action of the silicone oil remaining in the system.

It is also well known that polyoxyalkylene monools or diols, or their ethers exhibit antifoaming or defoaming properties in aqeuous systems in which they are insoluble. Usually, the monools or diols of polyaddition products of ethylene oxide and propylene oxide have been used. Polyaddition products which contain oxyethylene units exclusively develop their defoaming action at or after passing their cloud point in aqueous solution.

In order to obtain products with improved defoaming properties, copolymers which comprise polyoxyalkylene and polysiloxane blocks, have also been synthesized. Especially preferred in this connection are block copolymers whose polyoxyalkylene block contain at least 80 weight percent of oxypropylene units. Such a preparation is described, for example, in DE-AS No. 24 43 853. With this preparation, the defoaming effectiveness can be increased even further by addition of microdispersed silica, which is produced, for example, by flame hydrolysis.

German Pat. No. 23 45 335 discloses a defoamer for aqueous solutions or dispersions consisting of 80 to 95 weight percent of a mineral, vegetable or animal oil, 1 to 7.5 weight percent of microdispersed silica or microdispersed aluminum oxide, and 1.0 to 10 weight percent of a methylpolysiloxanepolyoxyalkylene block copolymer, the methylpolysiloxane block of which constitutes 10 to 60 weight percent of the polymer and the polyoxyalkylene block of which contains 80 to 100 weight percent of oxypropylene units.

Most of the foam preventing or foam eliminating compounds known from the state of the art, are not resistant to attack by acidic or alkaline media. They are decomposed in the course of time, especially at elevated temperatures, and then lose their effectiveness.

SUMMARY OF THE INVENTION

We have discovered foam preventing or foam eliminating compounds which are acid stable and/or alkaline stable. The compounds are free from organosilicon groups and thus avoid difficulties during the further use of the defoamed media. Additionally, the compounds are readily and easily synthesized by a simple procedure and exhibit their antifoaming activity even at low concentrations in the range of a few ppm.

More particularly, we have discovered that polymers of alkylvinyl ethers having a specific molecular weight possess these attributes and are advantageously used as antifoaming agents.

Such polymers of alkylvinyl ethers have an alkyl group having 2 to 18 carbon atoms, and a weight average molecular weight $\overline{M}_w$ of 400 to 10,000. They are used in antifoaming or defoaming effective amounts, and particularly, in amounts from 1 to 200 ppm for preventing or eliminating foam on aqueous media.

DESCRIPTION OF THE PREFERRED EMBODIMENTS

As used herein, the weight average molecular weight is defined as:

$$\overline{M}_w = \frac{\Sigma n_i \cdot M_i^2}{\Sigma n_i \cdot M_i}$$

wherein $n_i$ is the number of moles with the molecular weight $M_i$ (Houben-Weyl, "Methoden der organischen Chemie" -Methods of Organic Chemistry- Georg Thieme-Verlag, Stuttgart, Vol. XIV/1, page 19). The molecular weight $M_i$ may, moreover, be determined by gel chromatography or viscosimetry.

Examples of alkylvinyl ethers, suitable for the synthesis of the polymers that are to be used according to the invention, are ethyl, butyl, isobutyl, ethylhexyl, octyl, decyl, hexadecyl and octadecyl vinyl ethers.

The polymers of the alkylvinyl ethers can be synthesized by known procedures, for example, by means of cationic initiators, such as, Lewis acids, for example, $BF_3$, $AlCl_3$, $SnCl_4$, or their complexes with ethers, as well as metal sulfates, such as, $Al_2(SO_4)_3 \cdot 7 H_2O$. Such polymerization procedures are described in "Methoden der Organischen Chemie" (Methods of Organic Chemistry) Georg Thieme-Verlag, Stuttgart, Vol. XIV/1, page 927 ff.

The polymers used according to the invention may be homopolymers or copolymers of alkylvinyl ethers with different radicals.

Especially preferred are polymers of alkylvinyl ethers, whose alkyl radical has 4 to 10 carbon atoms and especially 4 carbon atoms. Moreover, polymers of alkylvinyl ethers having branched alkyl radicals are, in general, more effective than polymers of alkylvinyl ethers with straight-chain alkyl radicals. Polymers of alkylvinyl ethers, which have the isobutyl radical as alkyl radical, are therefore especially preferred.

If polymers of alkylvinyl ethers are used, the alkyl radical of which have more than 6 carbon atoms, the lower range of the molecular weight should be selected in such a manner, that at least oligomeric alkylvinyl ethers with at least 3 vinyl units are present.

U.S. Pat. No. 3,127,352 discloses that certain high molecular weight polymers of polyvinyl ethers have a defoaming effect. However, the polyvinyl ethers are used to defoam liquid hydrocarbons and it is stated that the molecular weight of the polymers used must be at least 150,000. As the molecular weight decreases, the polymers lose their defoaming effectiveness for liquid hydrocarbons and are ineffective when their molecular weight is below 50,000. Consequently, the use of relatively low molecular weight polymers of alkylvinyl ethers for defoaming aqueous media in accordance with the present invention is not taught by U.S. Pat. No. 3,127,352.

The polymers for use in accordance with the invention are added either in pure form or preferably in the form of an emulsion to the aqueous medium that is to be defoamed. In this connection, the polymers are emulsified particularly in mixtures of water and alcohols, such as, for example, isopropyl alcohol. The use of such emulsions facilitates the distribution and dosage of the agents used according to the invention. Advisably, the emulsions contain 5 to 50 weight percent of active substance.

The stability of the emulsions of the active material can be increased by the addition of known emulsifiers, especially of nonionic emulsifiers. Examples of suitable emulsifiers are the addition product of ethylene oxide on tridecyl alcohol or nonyl phenol.

Finely particulate silica may be added to the active material or to the emulsion containing the active material. Especially silica, which has been obtained by flame pyrolysis and which optionally has been hydrophobized in a known manner over all or a part of its surface, is used for this purpose. The use of silica in amounts equal to the weight of the active material is especially preferred. However, excellent results may be achieved by the addition of lesser amounts, for example, of 5 weight percent based on the active material.

The polymers used in accordance with the present invention are added in amounts of 1 to 200 ppm to the media which is to be defoamed. As a rule, it is sufficient to add from 1 to 100 and, generally, from 20 to 50 ppm of active material to the aqueous medium in order to reliably prevent the formation of foam or to destroy foam already present. The inventive polymers are resistant to the action of acids and alkalis and can be used successfully, for example, in corrosive and galvanizing baths, as well as in strongly alkaline solutions.

The synthesis of the polymers for use in accordance with the present invention is described in the following examples, in which the foam preventing and foam eliminating action of these polymers is also demonstrated.

EXAMPLE 1

(A) Synthesis of Polyisobutylvinylether (not according to the invention)

To a solution of 0.45 g of a complex of boron trifluoride and diethyl ether in 200 g of toluene dried over sodium metal, 400 g (=approximately 4 moles) of i-butylvinyl ether dried over a molecular sieve, are added dropwise over a period of 1 hour at a temperature of 60° C. with stirring and under a stream of nitrogen that has been dried with concentrated sulfuric acid. After the addition, heating is continued for a further hour at 60° C. After the reaction is completed, 100 g of doubly distilled water and 0.6 g of a 25% aqueous ammonia solution are added to the solution obtained and carefully mixed with it. Finally, the aqueous phase is removed, the toluene phase is washed twice more with water and toluene and residual water are distilled off at 80° C. under the vacuum of a water jet pump.

The product obtained is a clear, slightly yellowish liquid with a viscosity of 750 mPas. From gel chromatographic analysis, the weight average molecular weight $\overline{M}_w$ is determined to be 1080 and the number average molecular weight $\overline{M}_n$ is determined to be 870. $\overline{M}_n$, the number average molecular weight, is defined as the weight of a sample divided by the number of moles (Houben-Weyl, loc. cit., page 19).

(B) Application Test

The product obtained according to A) (9.5 g) is dissolved in 10 g of toluene and 0.5 g of a hydrophobized, microdispersed, precipitated silica as well as 10 g of isopropanol are added to it. Into the dispersion so obtained, 10 g of deionized water are dispersed with the help of a Mizer disk rotating at 1,750 rpm within a period of 2 minutes.

The dispersion obtained (50 ppm) is introduced with a medical syringe into 1 liter of an aqueous solution of a surfactant consisting of 2 parts by weight of the sodium salt of an alkylbenzenesulfonic acid and one part by weight of an ethoxylated nonyl phenol, after a foam volume of about 1 l has been produced over this solution by passing a stream of air through a frit. The foam collapses within a few seconds. A foam volume of 1 l is reached again only after continuous introduction of air for a period of 70 minutes.

EXAMPLE 2

Determination of the Relationship Between the Defoaming Action of Polyisobutylvinylethers and Their Molecular Weight Polyisobutylvinylethers of different molecular weights are synthesized by the method of Example 1, but using different concentrations of initiator, and their properties as defoamers are examined. Table 1 shows the molecular weights $\overline{M}_w$ and $\overline{M}_n$ obtained when different amounts of boron trifluoride etherate are used per ml of isobutylvinyl ether, the conversions achieved, as well as the period of time that air needs to be passed into the mixture in order to achieve a foam volume of 1 l when using 50 ppm of a dispersion prepared in accordance with 1 B).

TABLE 1

| Test No. | Initiator (g 100/g monomer) | $\overline{M}_w$ | $\overline{M}_n$ | Conversion n (%) | t (min.) |
|---|---|---|---|---|---|
| 1 | 0.565 | 650 | 590 | 99 | 30 |
| 2 | 0.339 | 760 | 670 | 99 | 39 |
| 3 | 0.226 | 850 | 740 | 99 | 53 |
| 4 | 0.113 | 1180 | 950 | 98 | 70 |
| 5 | 0.057 | 1850 | 1450 | 97 | 59 |
| 6 | 0.011 | 3500 | 2690 | 96 | 3 |

This clearly shows that the molecular weight range of 800 to 1,800 represents a maximum for the defoaming action of the polyisobutylvinylethers. However, this maximum depends on the nature of the aqueous system that is to be defoamed.

EXAMPLE 3

Synthesis of a Poly(2-ethylhexylvinyl Ether) and Testing its Application

As in Example 1 but using 0.29 g (0.072 g/100 g of monomer) of boron trifluoride etherate for the polymerization of 400 g (=approx. 2.6 moles) of 2-ethylhexylvinyl ether, a polymer with the molecular weights of $\overline{M}_w = 1280$ and $\overline{M}_n = 1020$ is obtained as a clear, slightly yellowish liquid with a viscosity of 730 mPas. When a dispersion prepared according to the method of 1 B) is used in a concentration of 50 ppm, a period of 46 minutes is required for the renewed formation of 1 l of foam.

EXAMPLE 4

Synthesis of an Isobutylvinyl Ether-2-Ethylhexylvinyl Ether Copolymer and Testing Its Application As in Example 1, but using 0.37 g (=0.09 g/100 g of monomer) of boron trifluoride etherate for the copolymerization of 200 g (approx. 2 moles) of isobutylvinyl ether and 200 g (approx. 1.3 moles) of 2-ethylhexylvinyl ether, a copolymer with the molecular weights of $\overline{M}_w=1050$ and $\overline{M}_n=890$ is obtained as a clear, slightly yellowish solution with a viscosity of 680 mPas. When a dispersion, prepared according to the method of 1 B) is used in a concentration of 50 ppm, a period of 40 minutes is required for the renewed formation of 1 l of foam.

EXAMPLE 5

Synthesis of Various Alkylvinyl Ether Copolymers and Testing Their Application

As in Example 1 and using 0.45 g of boron trifluoride etherate, consisting of two alkylvinyl ethers with different alkyl groups (4 moles in all) were polymerized. The nature of the alkyl group of the two alkyl vinyl ethers used, the weight ratio selected, the average molecular weights $\overline{M}_w$ and $\overline{M}_n$, as well as the time required in the defoaming test for the renewed formation of 1 l of foam are shown in Table 2.

TABLE 2

| Alkylvinyl-Ether 1 | Alkylvinyl-Ether 2 | Weight Ratio | $\overline{M}_w$ | $\overline{M}_n$ | t (min.) |
|---|---|---|---|---|---|
| isobutyl- | ethyl- | 80/20 | 1250 | 1040 | 12 |
| " | " | 50/50 | 1280 | 1070 | 2 |
| " | n-butyl- | 50/50 | 1170 | 1000 | 65 |
| " | 2-ethylhexyl- | 80/20 | 1120 | 950 | 57 |
| " | " | 50/50 | 1090 | 890 | 40 |
| " | octadecyl- | 80/20 | 1100 | 920 | 39 |
| " | " | 50/50 | 1080 | 930 | 15 |
| ethyl- | " | 80/20 | 1250 | 1010 | 32 |
| " | " | 50/50 | 1190 | 970 | 18 |

It is clearly shown that polymers of alkylvinyl ethers with about 4 carbon atoms in the alkyl group have the greatest defoaming action.

EXAMPLE 6

Synthesis of an Emulsion of Polyisobutylvinylether and Testing Its Application

In a vessel equipped with a turbine stirrer, 200 parts by weight of the polyisobutylvinylether obtained by the method of Example 1 A) is preemulsified with 800 parts by weight of a solution consisting of 20 parts by weight of an ethoxylated stearyl alcohol (with an HLB value of 5) and 30 parts by weight of an ethoxylated triglyceride (with an HLB value of 17), 5 parts by weight of a polysaccharide, 2 parts by weight of a preservative, as well as 743 parts by weight of water. The oil-in-water emulsion obtained is subsequently treated by homogenizing it three times in a slot homogenizer.

The emulsion obtained is introduced with the help of a medical syringe in an amount of 250 ppm corresponding to the addition of 50 ppm of active material, into 1 l of the following three different aqueous solutions:

A. a surfactant of two parts by weight of the sodium salt of an alkylbenzenesulfonic acid and 1 part by weight of a nonylphenol glycol ether;
B. a surfactant of 1 part by weight of dodecylbenzenesulfonate and 1 part by weight of fatty alcohol polyglycol ether;
C. a surfactant of sodium lauryl sulfate, after a foam volume of about 1 l has been generated over these solutions by passing a stream of air (6 l/min) through a frit. In each case, the foam collapses within a few seconds.

With mixture A, the concentration of the solution is 0.1% and a foam volume of 1 l is again reached after the continued introduction of air for 57 minutes. With mixture B, the concentration of the solution is 1% and the foam volume of 1 l is reached after 28 minutes. With mixture C the concentration of the solution is 0.5% and the foam volume of 1 l is reached after 61 minutes.

We claim:

1. In a method for preventing or eliminating foam in aqueous media wherein a foam preventing or eliminating effective amount of defoaming agent is added to the aqueous media, the improvement which comprises said defoaming agent comprising one or more polymers of alkylvinyl ethers having alkyl radicals containing from 1 to 18 carbon atoms and a weight average molecular weight ,eovs/M/ $_w$ of from 400 to 10,000.

2. The method of claim 1 wherein the amount cf defoaming agent is from 1 to 200 ppm.

3. The method of claim 1 wherein the alkyl radical has from 4 to 10 carbon atoms.

4. The method of claim 2 wherein the alkyl radical has from 4 to 10 carbon atoms.

5. The method of claim 1 wherein the alkyl radical has 4 carbon atoms.

6. The method of claim 2 wherein the alkyl radical has 4 carbon atoms.

7. The method of claim 1 wherein the alkyl radical is branched.

8. The method of claim 2 wherein the alkyl radical is branched.

9. The method of claim 7 wherein the alkyl radical is isobutyl.

10. The method of claim 8 wherein the alkyl radical is isobutyl.

11. The method of claim 1 wherein the alkyl radical has more than 6 carbon atoms and oligomeric alkylvinyl ethers with at least 3 vinyl units are present.

12. The method of claim 2 wherein the alkyl radical has more than 6 carbon atoms and oligomeric alkylvinyl ethers with at least 3 vinyl units are present.

13. The method of claim 1 wherein the defoaming agent is in the form of an emulsion.

14. The method of claim 2 wherein the defoaming agent is in the form of an emulsion.

15. The method of claim 13 wherein the emulsion is emulsified with a mixture of alcohol and water.

16. The method of claim 14 wherein the emulsion is emulsified with a mixture of alcohol and water.

17. The method of claim 15 wherein the alcohol is isopropyl alcohol.

18. The method of claim 16 wherein the alcohol is isopropyl alcohol.

19. The method of claim 13 wherein the emulsion contains from 5 to 50 weight percent of the defoaming agent.

20. The method of claim 14 wherein the emulsion contains from 5 to 50 weight percent of the defoaming agent.

21. The method of claim 13 wherein the emulsion contains a stabilizer.

22. The method of claim 14 wherein the emulsion contains a stabilizer.

* * * * *